United States Patent
Lee et al.

(10) Patent No.: US 6,694,201 B1
(45) Date of Patent: Feb. 17, 2004

(54) SUPERVISORY PARALLEL SWITCHING DEVICE FOR COMPUTER INTEGRATED MANUFACTURING SYSTEM WITH SECS-COMPLIANT SERIAL COMMUNICATION LINKS

(75) Inventors: Wen-Yo Lee, Taipei Hsien (TW); Chun-Hung Liu, HsinChu (TW); Chien-Rong Huang, Hsinchu (TW); Shao-Kung Chang, Hsinchu (TW); Jou Chyn, Taipei Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 721 days.

(21) Appl. No.: 09/639,984

(22) Filed: Aug. 17, 2000

(51) Int. Cl.[7] .............................................. G06F 19/00
(52) U.S. Cl. ................................ 700/96; 700/4; 700/9; 700/19; 700/82; 340/3.1; 340/3.9; 370/366; 370/367; 370/218
(58) Field of Search ................................ 700/9, 2–3, 4, 700/5, 19, 23, 21, 95, 96, 104, 83, 79–81; 340/3.1–3.9; 370/366, 367, 360

(56) References Cited

U.S. PATENT DOCUMENTS

| | | | |
|---|---|---|---|
| 4,047,080 A | * 9/1977 | Peterson | 318/79 |
| 4,545,078 A | * 10/1985 | Wiedeburg | 398/166 |
| 5,369,400 A | * 11/1994 | Bowdon | 340/2.22 |
| 6,204,717 B1 | * 3/2001 | Nagasu et al. | 327/318 |
| 6,557,241 B1 | * 5/2003 | Sasaki | 29/603.13 |

FOREIGN PATENT DOCUMENTS

JP 408228196 A * 9/1996 ........... H04L/12/28

* cited by examiner

Primary Examiner—Ramesh Patel
(74) Attorney, Agent, or Firm—Shoemaker and Mattare

(57) ABSTRACT

A supervisory parallel switching device is designed for use with a CIM system including a host computer unit connected via an extended computer integrated unit to at least one equipment unit through an SECS-compliant (Semiconductor Equipment Communication Standard) serial communication link, for the purpose of allowing the equipment unit to be continuously under computer control even in the event of an unanticipated shutdown to the extended computer integrated unit. The supervisory parallel switching device includes a plurality of switching units, such as relays, under control by a control logic unit to be switched on in such a manner that, when the extended computer integrated unit operates normally, the control logic unit activates these switching units to connect both the equipment unit and the host computer unit to the extended computer integrated unit, allowing the equipment unit to be chiefly controlled by the extended computer integrated unit; while in the event of an unanticipated shutdown to the extended computer integrated unit, the control logic unit activates these switching units to connect the equipment unit directly to the host computer unit, thus allowing the equipment unit to be continuously controlled by the host computer unit. This feature allows each equipment unit in the CIM system to be uninterrupted in its fabrication process even where there is power failure or system crash in the extended computer integrated unit.

11 Claims, 9 Drawing Sheets

SUPERVISORY PARALLEL SWITCHING DEVICE FOR COMPUTER INTEGRATED MANUFACTURING SYSTEM WITH SECS-COMPLIANT SERIAL COMMUNICATION LINKS

BACKGROUND OF THE INVENTION

1. Field of the Invention

This invention relates to CIM (Computer Integrated Manufacturing) technology, and more particularly, to a supervisory parallel switching device which is designed for use with a CIM system including a host computer unit connected via an extended computer integrated unit to at least one equipment unit through an SECS-compliant (Semiconductor Equipment Communication Standard) serial communication link, for the purpose of allowing the equipment unit to be continuously under computer control even in the event of an unanticipated shutdown to the extended computer integrated unit.

2. Description of Related Art

The CIM technology is widely utilized in the semiconductor industry to provide a centralized computer control system of all the various fabrication processes in the factory where a large number of separate equipment units of different fabrication purposes are installed. In CIM technology, these separate equipment units are all linked to a host computer so that the various fabrication processes carried out through these equipment units can be centrally controlled. Conventionally, these equipment units are linked to the host computer unit through an SECS-compliant serial communication link, which allows control parameters and process status data to be exchanged between the host computer unit and each equipment unit.

FIG. 1 shows a conventional CIM system utilizing SECS-compliant serial communication links. As shown, this CIM system includes a host computer unit 10 and two equipment units 21, 22 (it is to be noted that in reality a CIM system may include several dozens of equipment units, but for purposes of simplification of illustration and description, only two equipment units are shown in FIG. 1). To allow the host computer unit 10 to control and monitor the fabrication process at each of the equipment units 21, 22, a first SECS-compliant serial communication link 21a is established between the host computer unit 10 and the first equipment unit 21, while a second SECS-compliant serial communication link 22a is established between the host computer unit 10 and the second equipment unit 22. Through the first SECS link 21a, the host computer unit 10 can issue control parameters to the first equipment unit 21 and receive process status data from the same, while through the second SECS link 22a, the host computer unit 10 can issue control parameters to the second equipment unit 22 and receive process status data from the same.

A drawback to the forgoing CIM system, however, exists because there are some problems when the host computer unit 10 is considered to increase supervisory functions without changing its original structure. That is if you attempt to change the original structure of the host computer unit 10 which controls the CIM system, the operation may stop, destroying the original system, and rendering the production procedure abnormal.

One solution to the foregoing problem is shown in FIG. 2. By this solution an extended computer integrated unit 30 is installed between the host computer unit 10 and each equipment unit 20. The extended computer integrated unit 30 is a separate computer unit which communicates with equipment unit 20 through a first SECS link 20a and communicates with the host computer unit 10 through a second SECS link 30a, and which is programmed to carry out dedicated data processing tasks specific to the linked equipment unit 20. As a result, the provision of the extended computer integrated unit 30 can help extend the supervisory capabilities of the host computer unit 10, allowing an overall increase to the throughput of the CIM system.

However, as shown in FIG. 3, the forgoing solution still has the drawback that in the event of an unanticipated shutdown to the extended computer integrated unit 30 due to, for example, power failure or system crash, it will disconnect the SECS links 20a, 30a and thereby put the equipment unit 20 beyond computer control, thus halting the current fabrication process at equipment unit 20. If equipment unit 20 is a crucial fabrication point, it would considerably affect the overall fabrication process over the entire CIM system.

One solution to the foregoing problem is to provide a software-based monitoring means in each extended computer integrated unit, which is capable of checking whether the data communication over the SECS link is normal or not. Thus, in the event of an extended computer integrated unit shutdown due to system crash, the software-based monitoring means would be capable of linking the associated equipment unit to the host computer unit. This solution would allow each equipment unit to be continuously under the control of the computer even when the associated extended computer integrated unit is in a shutdown state. However, this solution still has two drawbacks. Firstly, where the software-based monitoring means is not functioning, due, for example, to deadlock or power failure, it would be unable to reconnect the equipment unit to the host computer unit in the event of an extended computer integrated unit shutdown. Secondly, the design of software-based monitoring means requires the software developer to fully understand the SECS protocol and the data communication contents between the host computer and each particular type of equipment unit, which would make the development of communication links and content quite laborious and make the developed software program suitable for use with only a particular equipment type.

SUMMARY OF THE INVENTION

It is therefore an objective of this invention to provide a supervisory parallel switching device for use with a CIM system with SECS links, which can allow each equipment unit to be continuously under computer control even in the event of an unanticipated extended computer integrated unit shutdown.

It is another objective of this invention to provide a supervisory parallel switching device for use with a CIM system with SECS links, which is functional even in the event of a power failure.

It is still another objective of this invention to provide a supervisory parallel switching device for use with a CIM system with SECS links, whose design requires no understanding of the communication protocol and contents between the host computer unit and each equipment unit, and which is suitable for use with various types of equipment units.

The supervisory parallel switching device of the invention is designed for use with a CIM system including a host computer unit connected by a SECS-compliant serial communication link via an extended integrated computer unit to at least one other equipment unit, for the purpose of connecting, in the event of a shutdown, the second equipment unit directly to the host computer unit and to the extended computer integrated unit; wherein the host computer unit and the equipment unit each has a communication port of a standardized type, while the extended computer integrated unit has a first passthrough port and a second passthrough port. The supervisory parallel switching device of the invention comprises: (a) a set of connecting ports, including a first connecting port which is connected to the communication port of the host computer unit; a second connecting port which is connected to the second passthrough port of the extended computer integrated unit; a third connecting port which is connected to the first passthrough port of the extended computer integrated unit; and a fourth connecting port which is connected to the communication port of the equipment unit; (b) switching means capable of being selectively switched between a first switch position and a second switch position in such a manner that when being switched to the first switch position, the switching means connects the fourth connecting port to the first connecting port; and when being switched to the second switch position, the switching means connects the fourth connecting port to the third connecting port and meanwhile connects the first connecting port to the second connecting port; and (c) a control logic unit, capable of detecting whether the extended computer integrated unit is in a normal operating state or in a shutdown state. When the extended computer integrated unit is in a normal operating state, the control logic unit activates the switching means to be switched to the second switch position, thereby linking the equipment unit through the extended computer integrated unit to the host computer unit; and when the extended computer integrated unit is in a shutdown state, the control logic unit activates the switching means to be switched to the first switch position, thereby linking the equipment unit directly to the host computer unit.

Therefore, when the extended computer integrated unit operates normally, the equipment unit is linked through the extended computer integrated unit to the equipment unit. However, in the event of an unanticipated shutdown to the extended computer integrated unit, the equipment unit will be promptly linked to the host computer unit, thus allowing the equipment unit to be continuously under computer control by the host computer unit without being interrupted by the extended computer integrated unit shutdown.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
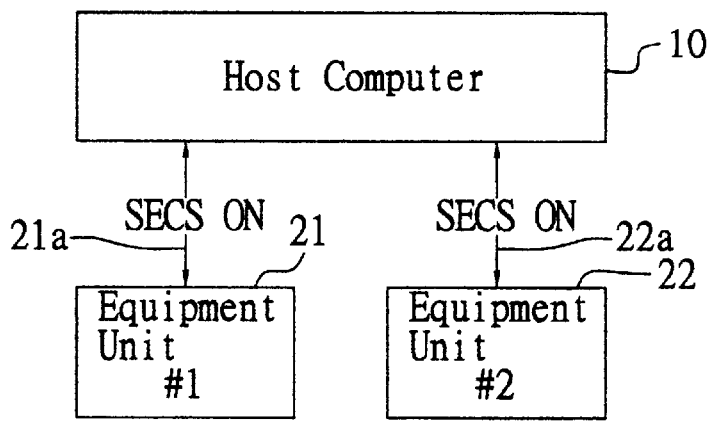
FIG. 1 (PRIOR ART) is a schematic block diagram of a conventional CIM system without an extended computer integrated unit.
Figure 2:
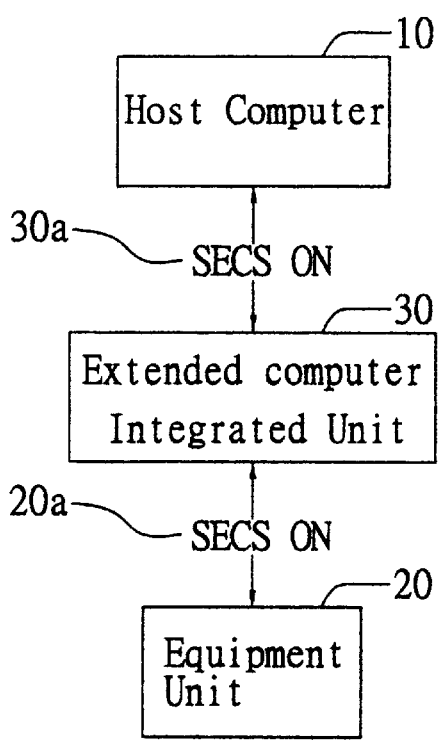
FIG. 2 (PRIOR ART) is a schematic block diagram of a conventional CIM system with an extended computer integrated unit.
Figure 3:
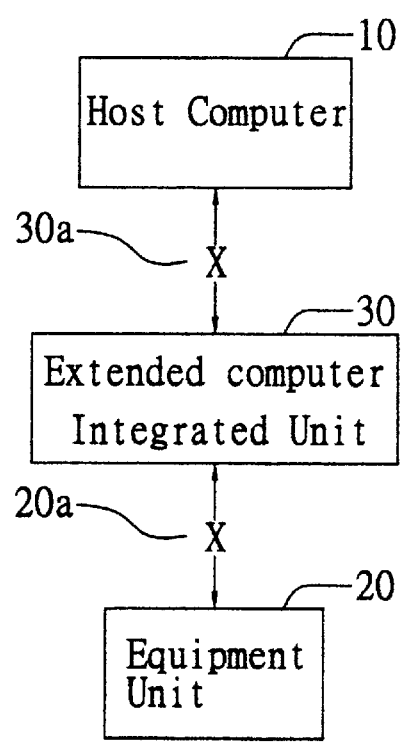
FIG. 3 (PRIOR ART) shows FIG. 2 while in an extended computer integrated unit shutdown.
Figure 4:
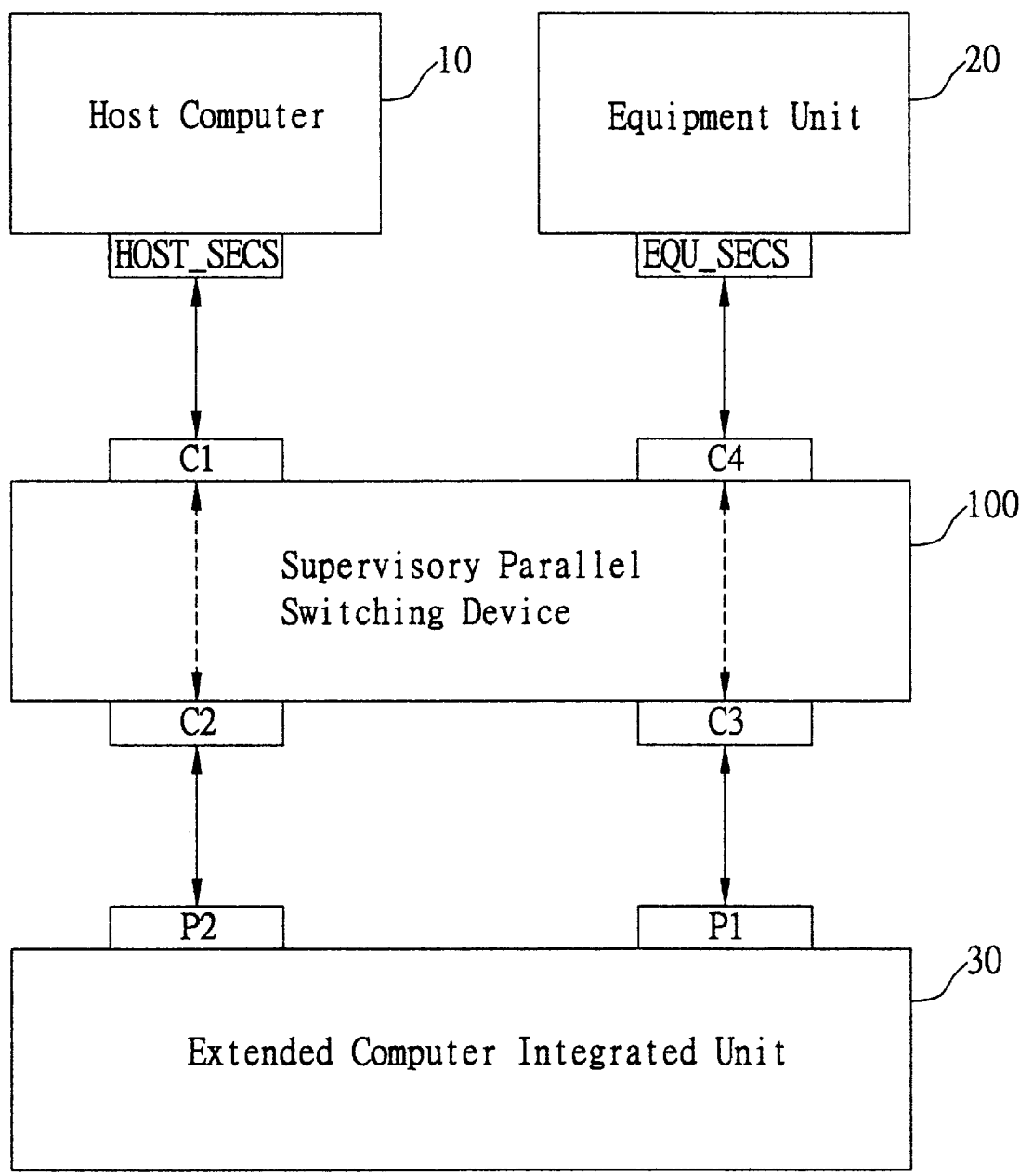
FIG. 4 is a schematic block diagram of a CIM system utilizing the supervisory parallel switching device of the invention.

FIG. 4 is a schematic block diagram of a CIM system utilizing the supervisory parallel switching device according to the invention. As shown, the CIM system includes a host computer unit 10, at least one equipment unit 20, and an extended computer integrated unit 30, and further includes a supervisory parallel switching device 100 designed in accordance with the invention and coupled between the host computer unit 10, the equipment unit 20, and the passthrough unit 30.

To allow external data communication, the host computer unit 10 is provided a standardized communication port, such as an SECS-compliant serial communication port, denoted as HOST_SECS; and correspondingly, the equipment unit 20 is also provided with an SECS-compliant serial communication port, denoted as EQU_SECS. To allow passthrough communication, the extended computer integrated unit 30 is provided with a first passthrough port P1 and a second passthrough port P2, which are both SECS-compliant serial communication ports.

The supervisory parallel switching device 100 is provided with four external connecting ports C1, C2, C3, and C4; wherein the first connecting port C1 is connected to the HOST_SECS port on the host computer unit 10; the second connecting port C2 is connected to the second passthrough port P2 on the extended computer integrated unit 30; the third connecting port C3 is connected to the first passthrough port P1 on the extended computer integrated unit 30; and the fourth connecting port C4 is connected to the EQU_SECS port on the equipment unit 20.

Figure 5:
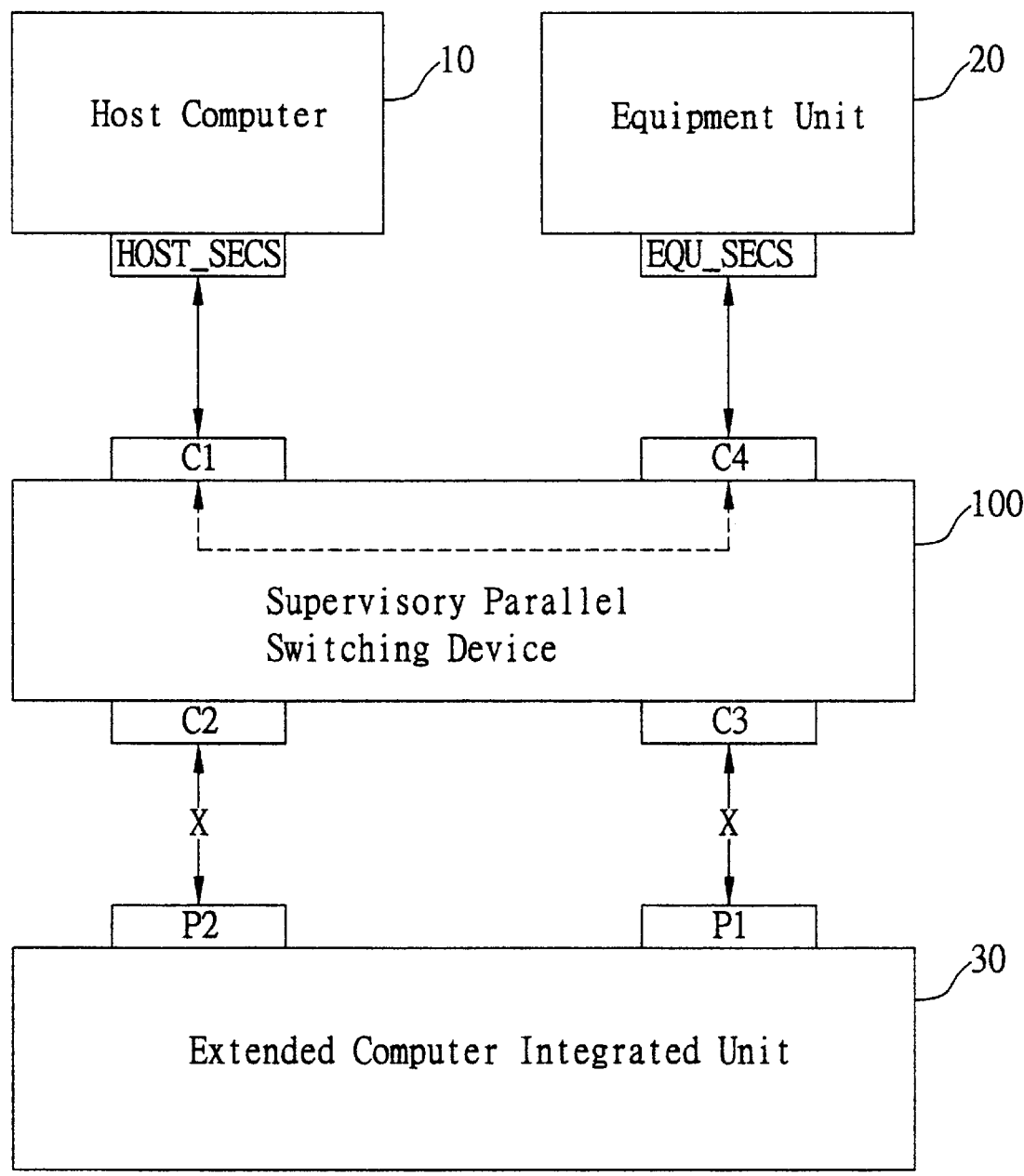
FIG. 5 shows FIG. 4 while in an extended computer integrated unit shutdown.

The supervisory parallel switching device 100 is designed in accordance with the invention to operate in such a manner that when the extended computer integrated unit 30 operates normally, it connects the first connecting port C1 to the second connecting port C2 and meanwhile connects the third connecting port C3 to the fourth connecting port C4, i.e., (C1↔C2) and (C3↔C4), as the dashed lines in FIG. 4 show, thereby linking the equipment unit 20 through the extended computer integrated unit 30 to the host computer unit 10; and whereas, as shown in FIG. 5, in the event of a shutdown to the extended computer integrated unit 30, the supervisory parallel switching device 100 can detect such a condition, it promptly disables the current connections (C1↔C2) and (C3↔C4) and switches the first connecting port C1 to be connected to the fourth connecting port C4, i.e., (C1↔C4), as indicated by the dashed line in FIG. 5, thereby linking the equipment unit 20 directly to the host computer unit 10. In the case of FIG. 5, it allows the host computer unit 10 to substitute for the extended computer integrated unit 30 to perform process control for the equipment unit 20. As a result, even through in the event of an unanticipated extended computer integrated shutdown, the equipment unit 20 will still be under computer control and be able to carry out its current fabrication process without being interrupted by the extended computer integrated shutdown.

Figure 6:
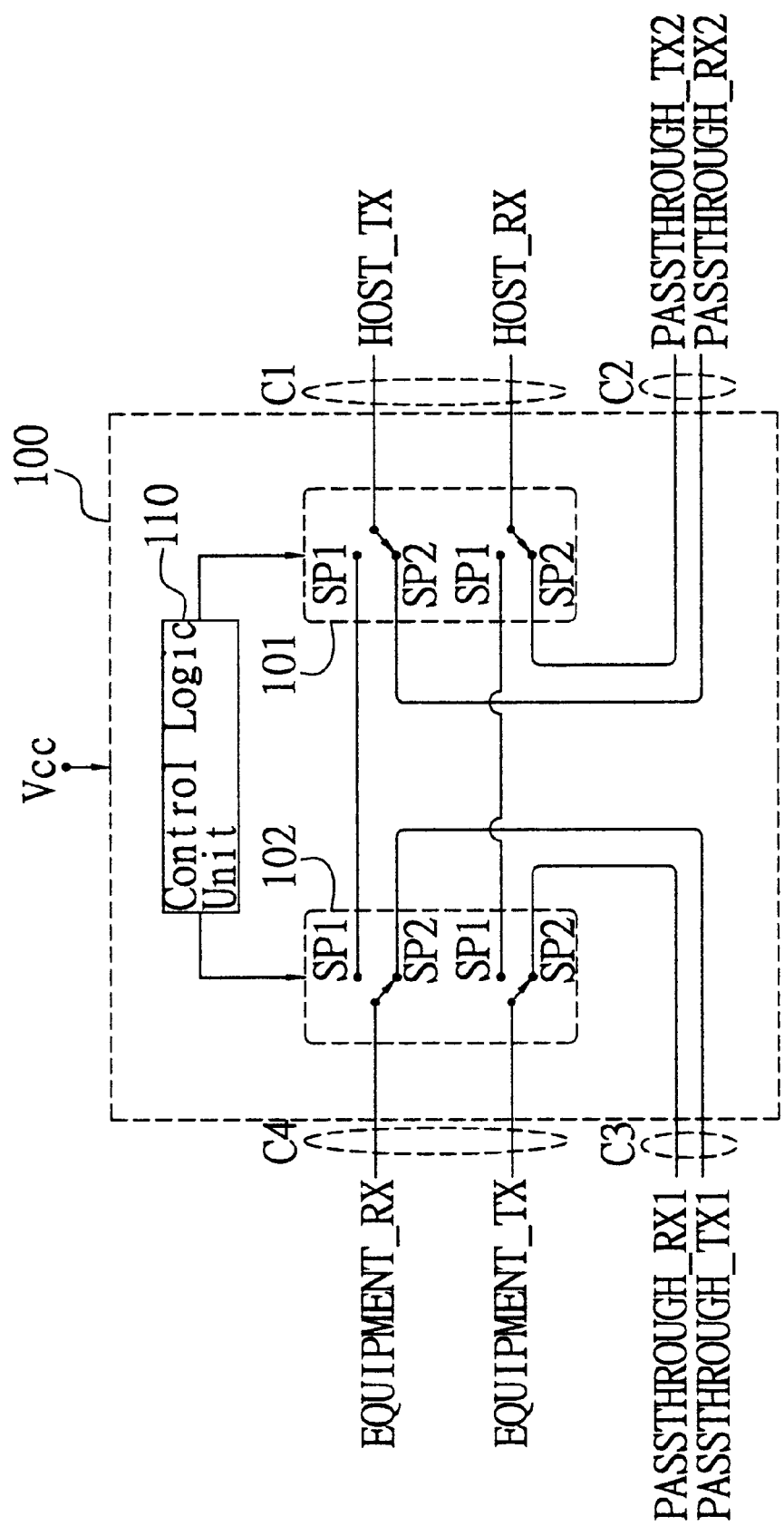
FIG. 6 is a schematic circuit diagram showing detailed inside architecture of the supervisory parallel switching device of the invention.

FIG. 6 is a schematic circuit diagram showing detailed inside architecture of the supervisory parallel switching device 100 of the invention. As shown, the first connecting port C1 is used for connection to a pair of signal lines (HOST_TX, HOST_RX) in the SECS link to the host computer unit 10, where HOST_TX represents host data transmission, and HOST_RX represents host data reception. The second connecting port C2 is used for connection to a pair of signal lines (PASSTHROUGH_TX2, PASSTHROUGH_RX2) in the SECS link to the second passthrough port P2 on the extended computer integrated unit 30, where PASSTHROUGH_LX2 represents passthrough data transmission to the host computer unit 10, and PASSTHROUGH_RX2 represents passthrough data reception from the host computer unit 10. The third connecting port C3 is used for connection to a pair of signal lines (PASSTHROUGH_TX1, PASSTHROUGH_RX1) in the SECS link to the first passthrough port P1 on the extended computer integrated unit 30, where PASSTHROUGH_TX1 represents passthrough data transmission to the equipment unit 20, and PASSTHROUGH_RX1 represents passthrough data reception from the equipment unit 20. The fourth connecting port C4 is used for connection to a pair of signal lines (EQUIPMENT_RX, EQUIPMENT_TX) in the SECS link to the equipment unit 20, where EQUIPMENT_TX represents equipment data transmission, and EQUIPMENT_RX represents equipment data reception.

The supervisory parallel switching device 100 includes a first switching module 101, a second switching module 102, and a control logic unit 110. The two switching modules 101, 102 are each capable of being switchable between a first switch position SP1 and a second switch position SP2 under control by the control logic unit 110 in such a manner that when the control logic unit 110 detects that the extended computer integrated unit 30 is in a normal operating state, it will activate all the switching modules 101, 102 to be turned to the second switch position SP2; and whereas, when the control logic unit 110 detects that the extended computer integrated unit 30 is in a shutdown state, it will activate all the switching modules 101, 102 to be turned to the first switch position SP1.

The control logic unit 110 is capable of detecting whether the extended computer integrated unit 30 is in a normal operating state or in a shutdown state by continuously checking whether the data communication over the signal lines (HOST_TX, HOST_RX), (PASSTHROUGH_TX2, PASSTHROUGH_RX2), (PASSTHROUGH_TX1, PASSTHROUGH_RX1), and (EQUIPMENT_RX, EQUIPMENT_TX) are normally carried out in compliant with SECS protocol, for example, by checking whether the response time for each request to the extended computer integrated unit 30 exceeds a predefined timeout duration. If yes, the control logic unit 110 will promptly activate all the switching modules 101, 102 to be turned to the second switch position SP2.

As shown in FIG. 6, when all the switching modules 101, 102 are turned to the second switch position SP2, it connects the EQUIPMENT_RX and EQUIPMENT_TX signal lines respectively connected to the PASSTHROUGH_TX1 and PASSTHROUGH_RX1 signal lines, and meanwhile connects the HOST_TX and HOST_RX signal lines to be respectively connected to the PASSTHROUGH_RX2 and PASSTHROUGH_TX2 signal lines, thereby linking the equipment unit 20 to the first passthrough port P1 of the extended computer integrated unit 30 and meanwhile linking the host computer unit 10 to the second passthrough port P2 of the extended computer integrated unit 30. As a result, the equipment unit 20 is linked through the extended computer integrated unit 30 to the host computer unit 10.

Figure 7:
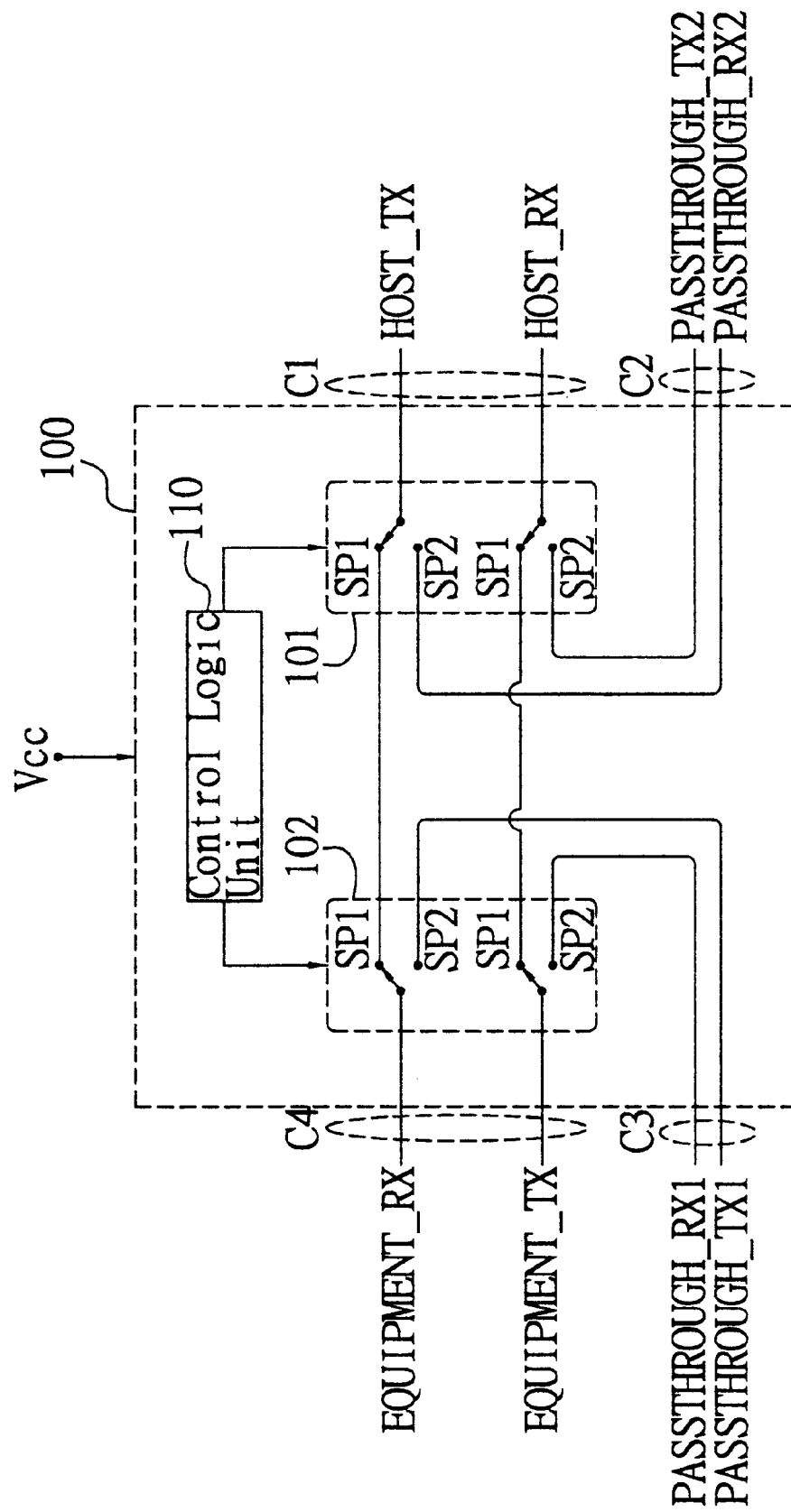
FIG. 7 shows FIG. 6 while in an extended computer integrated unit shutdown.

On the other hand, as shown in FIG. 7, when all the switching modules 101, 102 are turned to the first switch position SP1, it causes the EQUIPMENT_RX and EQUIPMENT_TX signal lines to be connected respectively to the HOST_TX and HOST_RX signal lines, thereby establishing a direct link between the equipment unit 20 and the host computer unit 10. As a result, the equipment unit 20 is disconnected from the extended computer integrated unit 30 and reconnected to the host computer unit 10, allowing the equipment unit 20 to be now controlled by the host computer unit 10.

Preferably, the supervisory parallel switching device 100 is powered by a system voltage $V_{CC}$ fetched from the extended computer integrated unit 30, and the two switching modules 101, 102 are implemented as relays which are switched to the second switch position SP2 when $V_{CC}$ is on and to the first switch position SP1 when $V_{CC}$ is off due to power failure. This embodiment allows the equipment unit 20 to be promptly linked to the host computer unit 10 even in the event of power failure at the extended computer integrated unit 30.

Therefore, when the extended computer integrated unit 30 operates normally, the equipment unit 20 is linked through the extended computer integrated unit 30 to the equipment unit 20; and whereas in the event of an unanticipated shutdown to the extended computer integrated unit 30, the equipment unit 20 will be promptly linked to the host computer unit 10, thus allowing the equipment unit 20 to be continuously under computer control by the host computer unit 10 without being interrupted by the passthrough shutdown.

Figure 8:
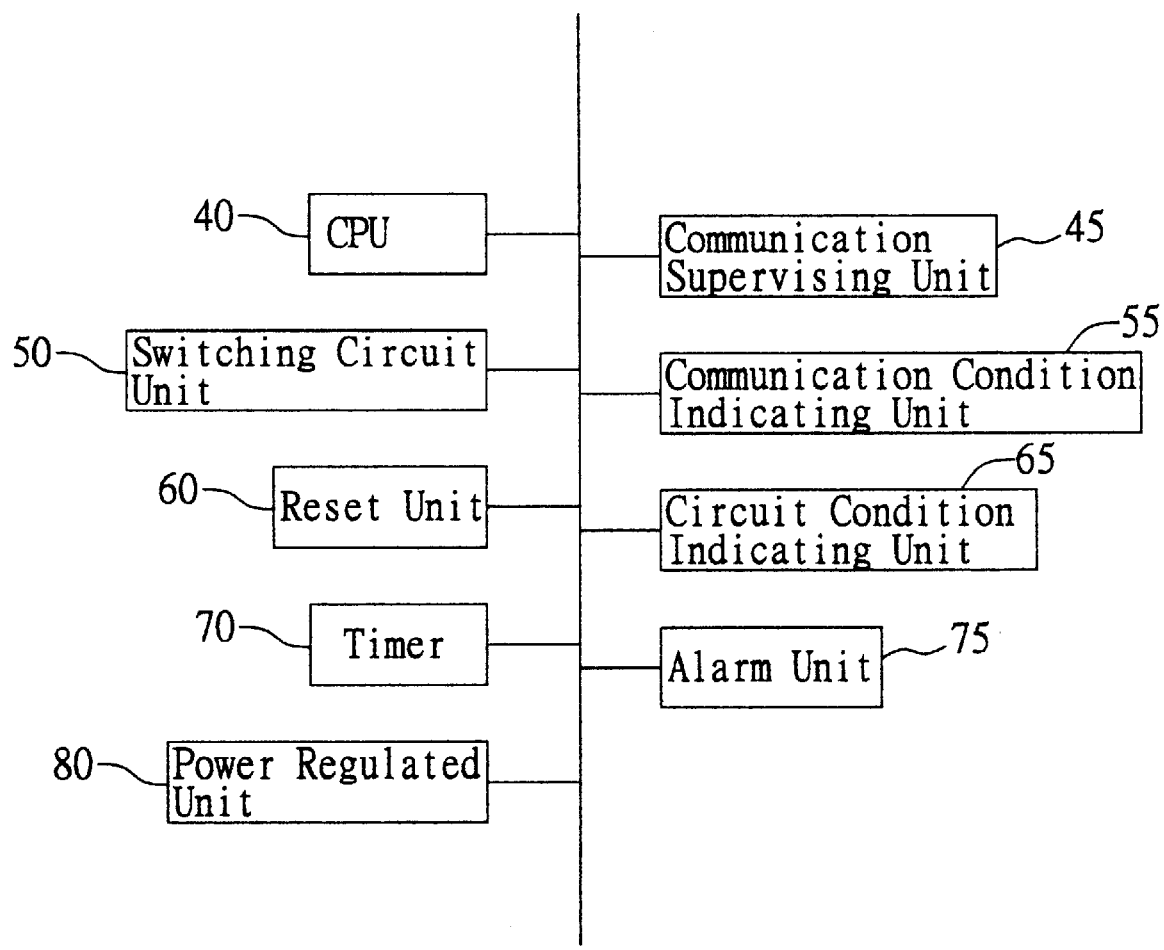
FIG. 8 is a schematic diagram of the structure of the designed units of the supervisory parallel switching device of the invention.

FIG. 8 is a schematic structure diagram of the designed units of the supervisory parallel switching device of the invention, comprising, totally 9 units, central processing unit (CPU) 40 for determining and analyzing the operation of the supervisory parallel switching device, communication supervising unit 45 for reading the data on the communication loop, switching circuit unit 50 for controlling the circuit switching, communication condition indicating unit 55 for displaying the current communication condition, reset unit 60 for resetting the switching mode, circuit condition indicating unit 65 for indicating the current switching circuit condition, and timer 70, alarm unit 75, and power regulated unit 80. When the extended computer integrated unit 30 is cut off by the operation of the supervisory parallel switching device of the invention, the alarm unit 75 begins to sound, while the switching circuit unit 50, which is a circuit selector arranged in mechanical type, switches to link the equipment unit to the host computer unit. The reset unit 60 can reset the supervisory parallel switching device from switching mode, in which the extended computer integrated unit 30 is cut off, to the normal operational mode, in which the extended computer integrated unit 30 is connected to the host computer unit and the equipment unit. The timer 70 supplies the critical reference time in the supervisory parallel switching device of the invention. Since the power regulated unit 80 adapts the input voltage to the supervisory parallel switching device selected from 9 to 24 voltage, it is unnecessary to consider the polarity of input voltage.

Figure 9:
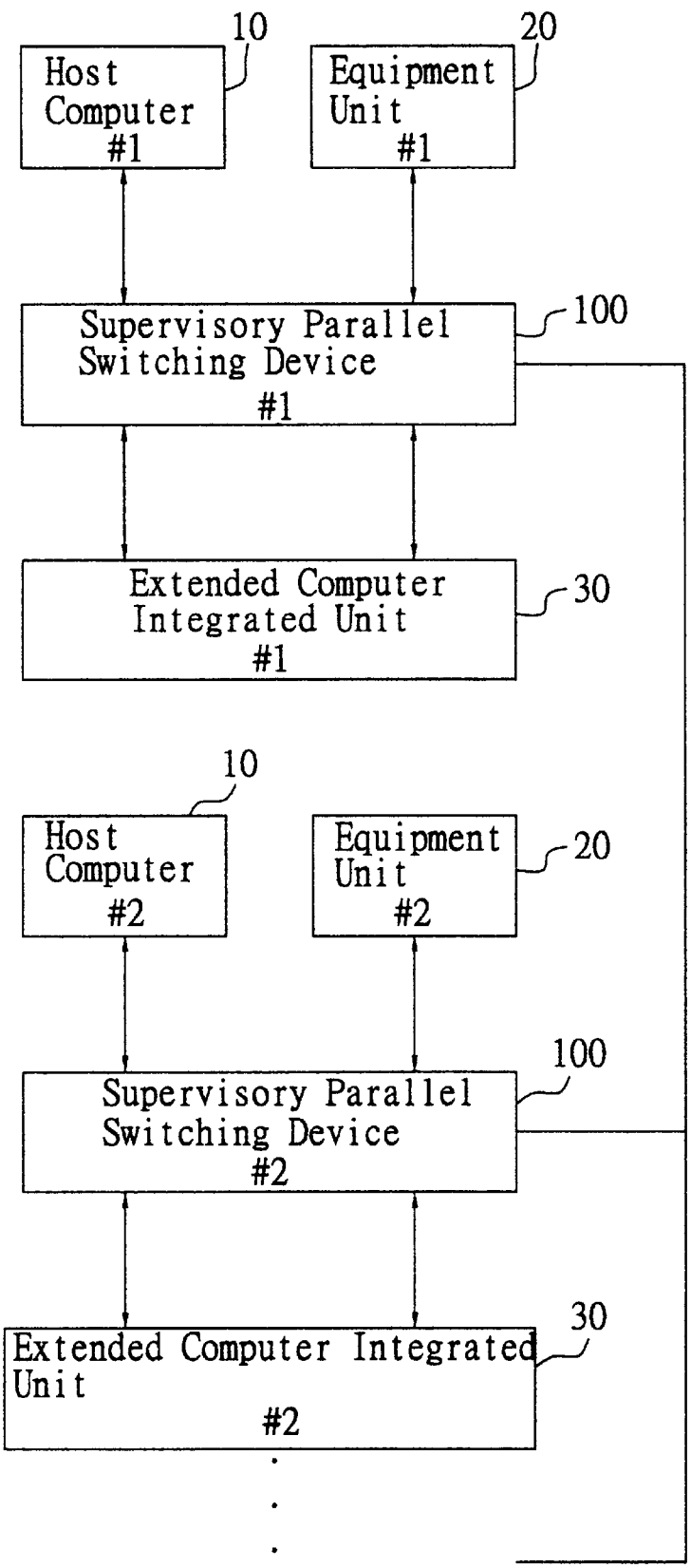
FIG. 9 is a basic block diagram showing the structure whereby the invention is utilized on a CIM system with multiple host computer units and equipment units.

FIG. 9 is a schematic block diagram showing the utilization of the invention on a CIM system with multiple host computer units and equipment units.

As shown, this CIM system includes a plurality of host computers units 10 and a plurality of equipment units 20. In accordance with the invention, each of the equipment units 20 is linked through one unit of the supervisory parallel switching device 100 of the invention to its associated host computer unit 10 and extended computer integrated unit 30. This arrangement allows every one of the equipment units 20 to be continuously under computer control even in the event of an unanticipated shutdown to any one of the extended computer integrated units 30.

Figure 10:
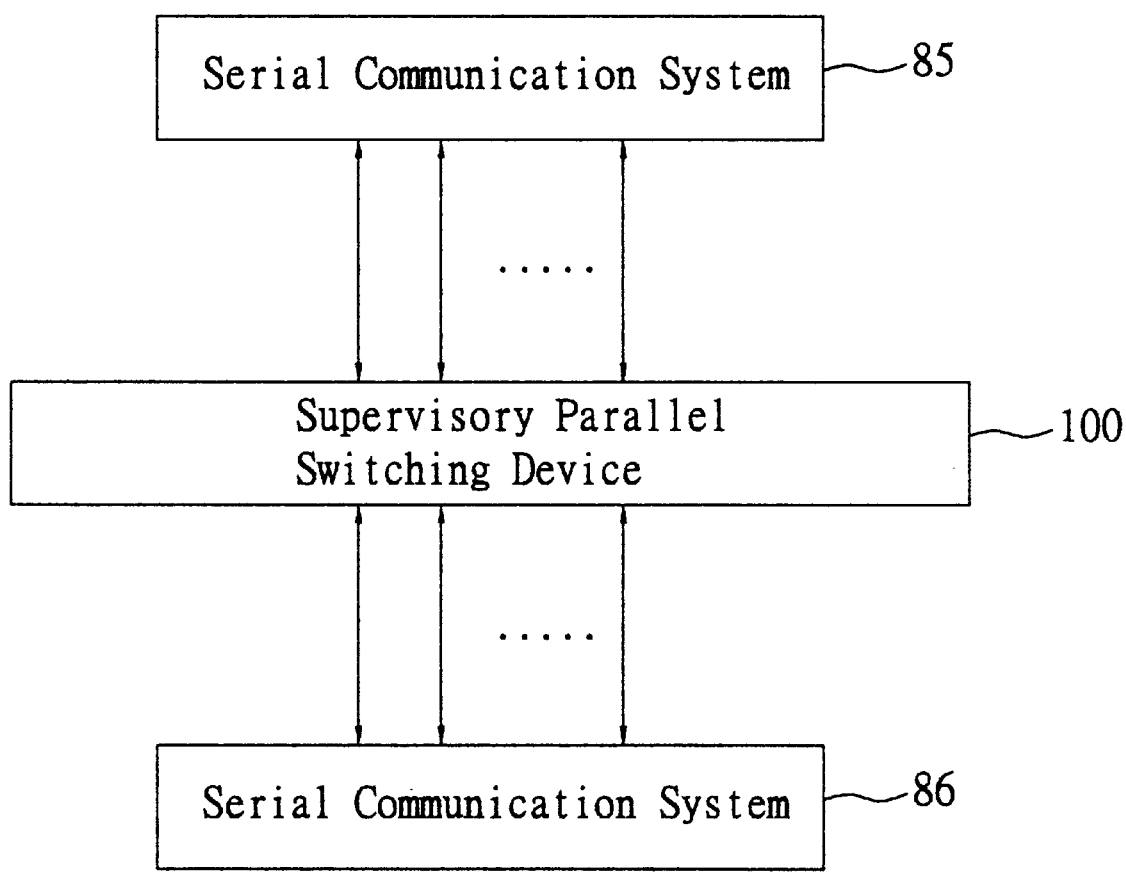
FIG. 10 is a schematic block diagram showing the utilizing of the invention in monitoring and controlling the system with at least two multiple communication ports.

FIG. 10 is a schematic block diagram showing the utilizing of the supervisory parallel switching device of the invention in at least two monitoring and controlling systems with multiple communication ports, wherein the supervisory parallel switching device 100 can simultaneously monitor and control the serial communication systems 85, 86 which have multiple communication ports.

Figure 11:
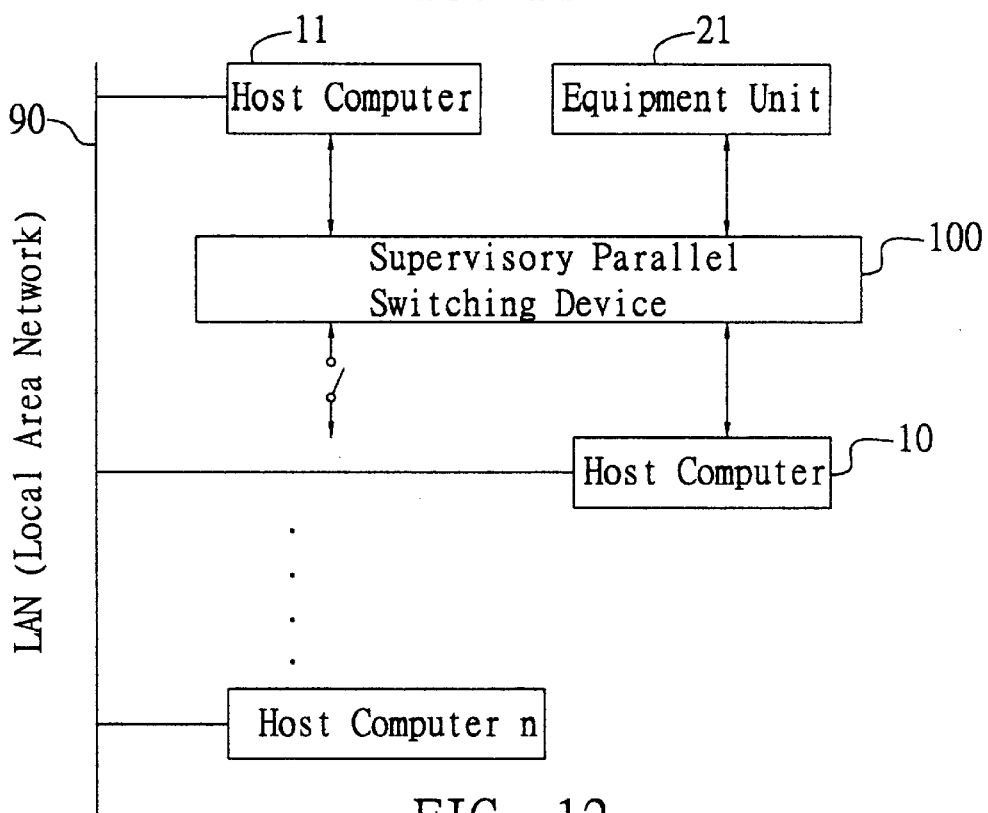
FIG. 11 is a schematic block diagram showing the utilizing of the invention in at least two host computer switching systems on a LAN.
Figure 12:
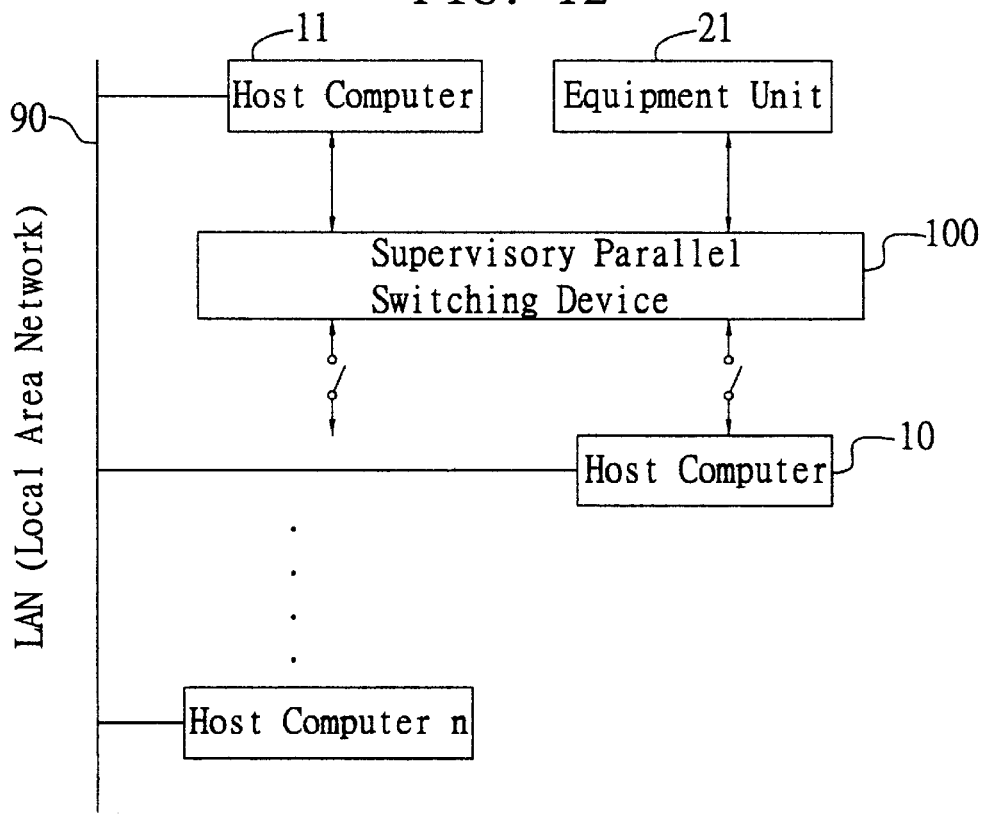
FIG. 12 shows FIG. 11 where the executed host computer is shutdown or the stand-by host computer is allowed to execute communication.

FIGS. 11 and 12 are schematic block diagrams showing the utilizing of the supervisory parallel switching device of the invention in at least two host computer switching systems on a local area network (LAN), wherein there are at least two host computer units 10, 11 on LAN 90. The supervisory parallel switching device 100 of the invention can immediately switch on the host computers, which cuts off the host computer 10 as shown in FIG. 12, if the executed host computer 10 fails to communicate or the standby host computer 11 is ready to communicate with the equipment unit 21.

In conclusion, the invention provides a supervisory parallel switching device which is designed for use with a CIM system for the purpose of allowing each equipment unit associated with an extended computer integrated unit in the CIM system to be continuously under computer control even in the event of a shutdown to the extended computer integrated unit. This benefit allows each equipment unit in the CIM system to be uninterrupted in the fabrication process due to power failure or system crash to the passthrough unit.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A supervisory parallel switching device for use with a CIM system including a host computer unit connected by a SECS-compliant serial communication link via an extended computer integrated unit to at least one equipment unit, for the purpose of connecting the equipment unit directly to the host computer unit in the event of a shutdown to the extended computer integrated unit; wherein the host computer unit and the equipment unit each has a communication port of a standardized type, while the extended computer integrated unit has a first passthrough port and a second passthrough port; the supervisory parallel switching device comprising:

(a) a set of connecting ports, including a first connecting port which is connected to the communication port of the host computer unit; a second connecting port which is connected to the second passthrough port of the extended computer integrated unit; a third connecting port which is connected to the first passthrough port of the extended computer integrated unit; and a fourth connecting port which is connected to the communication port of the equipment unit;

(b) switching means capable of being selectively switched between a first switch position and a second switch position in such a manner that when being switched to the first switch position, the switching means connects the fourth connecting port to the first connecting port; and when being switched to the second switch position, the switching means connects the fourth connecting port to the third connecting port and meanwhile connects the first connecting port to the second connecting port; and (c) a control logic unit, capable of detecting whether the extended computer integrated unit is in a normal operating state or in a shutdown state; wherein when the extended computer integrated unit is in a normal operating state, the control logic unit activates the switching means to be switched to the second switch position, thereby linking the equipment unit through the extended computer integrated unit to the host computer unit, and when the extended computer integrated unit is in a shutdown state, the control logic unit activates the switching means to be switched to the first switch position, thereby linking the equipment unit directly to the host computer unit.

2. The supervisory parallel switching device of claim 1, wherein the communication port of the host computer unit and the communication port of the equipment unit are each an SECS-compliant serial communication port.

3. The supervisory parallel switching device of claim 1, wherein the switching means comprises a plurality of relays.

4. The supervisory parallel switching device of claim 1, wherein the control logic unit detects whether the extended computer integrated unit is in a normal operating state or in a shutdown state by checking whether the response time for each request to the extended computer integrated unit exceeds a predefined timeout duration.

5. The supervisory parallel switching device of claim 1, wherein the extended computer integrated unit is a standalone computer unit.

6. A CIM system, comprising:

(a) at least one host computer unit having a communication port;

(b) at least one equipment unit having a communication port;

(c) at least one extended computer integrated unit having a first passthrough port and a second passthrough port; and (d) at least one supervisory parallel switching device which operates in such a manner that when the extended computer integrated unit operates normally, the supervisory parallel switching device links the equipment unit through the extended computer integrated unit to the host computer unit; and whereas in the event of a shutdown to the extended computer integrated unit, the supervisory parallel switching device links the equipment unit directly to the host computer unit.

7. The CIM system of claim 6, wherein the communication port of the host computer unit and the communication port of the equipment unit are both SECS-compliant serial communication ports.

8. The CIM system of claim 6, wherein the extended computer integrated unit is a standalone computer unit.

9. The CIM system of claim 6, wherein the supervisory parallel switching device includes:
(a) a set of connecting ports, including a first connecting port which is connected to the communication port of the host computer unit; a second connecting port which is connected to the second passthrough port of the extended computer integrated unit; a third connecting port which is connected to the first passthrough port of the extended computer integrated unit; and a fourth connecting port which is connected to the communication port of the equipment unit;
(b) switching means capable of being selectively switched between a first switch position and a second switch position in such a manner that when being switched to the first switch position, the switching means connects the fourth connecting port to the first connecting port; and when being switched to the second switch position, the switching means connects the fourth connecting port to the third connecting port and meanwhile connects the first connecting port to the second connecting port; and
(c) a control logic unit, capable of detecting whether the extended computer integrated unit is in a normal operating state or in a shutdown state; wherein
when the extended computer integrated unit is in a normal operating state, the control logic unit activates the switching means to be switched to the second switch position, thereby linking the equipment unit through the extended computer integrated unit to the host computer unit; and
when the extended computer integrated unit is in a shutdown state, the control logic unit activates the switching means to be switched to the first switch position, thereby linking the equipment unit directly to the host computer unit.

10. The CIM system of claim 9, wherein the switching means comprises a plurality of relays.

11. The CIM system of claim 9, wherein the control logic unit detects whether the extended computer integrated unit is in a normal operating state or in a shutdown state by checking whether the response time for each request to the passthrough unit exceeds a predefined timeout duration.

* * * * *